Figure 1:
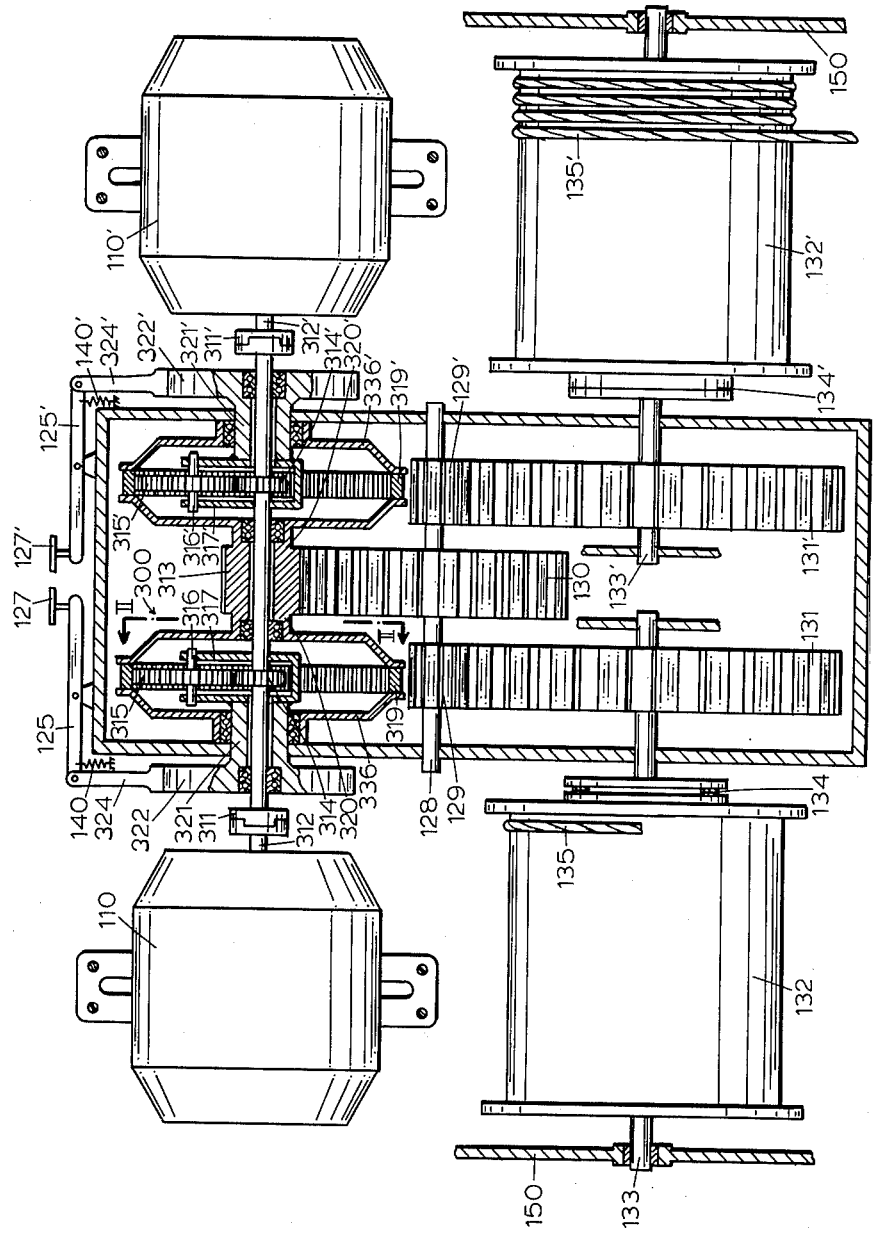

Oct. 2, 1962  H. EICHLER ETAL  3,056,314
DRIVE FOR CRANES, HOISTS AND THE LIKE
Filed March 7, 1960   2 Sheets-Sheet 2

Herbert Eichler
Werner Herzog
INVENTORS

BY  Karl F. Ross
AGENT.

United States Patent Office 3,056,314
Patented Oct. 2, 1962

3,056,314
DRIVE FOR CRANES, HOISTS AND THE LIKE
Herbert Eichler and Werner Herzog, Leipzig, Germany, assignors to VEB Schwermaschinenbau S. M. Kirow, Leipzig, Germany, a corporation of Germany
Filed Mar. 7, 1960, Ser. No. 13,100
3 Claims. (Cl. 74—770)

Our present invention relates to a multi-speed drive for cranes, hoists and similar load-raising devices.

While single-speed drives for cranes and hoists have long been in use, attempts to adapt conventional multi-speed drives, designed for other types of mechanisms, to load-raising machinery have not met with great success. Automotive-type transmissions are exemplary of speed-changing devices which are excluded from hoist applications for safety reasons as well as by the need for preventing excessive mechanical stresses in the hoisting equipment. Transmissions of this type are provided with a "neutral" position through which the systems must pass when changing speeds and wherein, be it only momentarily, the load is disconnected from the source of driving power. The load must be supported, therefore, in the neutral position by brakes to which the entire force of the load is applied directly. Other multi-speed drives employed hitherto have necessitated the use of a plurality of mutually independent power sources (e.g. electric motors), one for each speed step, adapted to be alternately coupled with the load. With such drives a maximal utilization of the installed motor capacity was not possible since each motor was available only for a single speed step.

It is an object of our invention to provide a multi-speed drive for cranes, hoists and the like which is adapted to make full use of the available motor capacity.

It is another object of this invention to provide a transmission system of this character wherein the same set of controls may be used for speed-changing and braking purposes.

It is a further object of the present invention to provide a two-speed drive wherein a load remains linked to the source of driving power during changes in transmission ratio.

According to a feature of the invention we provide at least two epicyclic gear trains, of different gear ratios representing respective transmission steps of a multi-speed drive, which are coupled with a common source of power. Each gear train consists of at least three gears of which two, constituting a first and a second gear (one of which may be a ring gear), are concentric and provided with co-axial shafts. A planetary gear, or a pair of such gears joined into a satellite unit, is rotatably mounted on a support capable of turning about its axis so as to mesh with the first and second gears while revolving about that axis at a differential speed. The support is provided with a third shaft co-axial with the other two.

The two epicyclic gear trains, accordingly, together have six shafts. Two of them, one from each gear train, are rigidly connected with each other to form a common input shaft adapted to be coupled with the source of driving power. Two other shafts, again one from each gear train, are also rigidly interconnected to form a common output shaft adapted to be coupled with the load. The remaining two shafts constitute a pair of control shafts provided with individual braking devices for controlling their speeds. Preferably, but not necessarily, the interconnected shafts perform analogous functions in the two gear trains.

With either of the two braking devices fully operative to lock the associated control shaft against rotation, the output shaft will be driven from the input shaft with a relative speed determined by the tooth ratio of the first and second gears and the planetary gear or gears of the corresponding epicyclic train. The absolute speed may now be controlled by applying a retarding force to the second control shaft with the aid of the other braking device. When both brakes are fully effective, the system locks by reason of the unequal transmission ratios of the two gear trains. The driving source (e.g. an electromotor) is advantageously provided with clutch means for disconnecting it from the common input shaft under these conditions. A partial release of either brake will then enable a controlled lowering of the load under its own weight.

If both brakes are inactivated, e.g. when no load is attached, both gear trains will be free-wheeling so that the transmission will idle to permit, for example, manual rotation with the motor clutched to the input shaft. Thus, the two brakes control the full gamut of operating conditions, including idling and standstill, which the system can accommodate.

Figure 2:
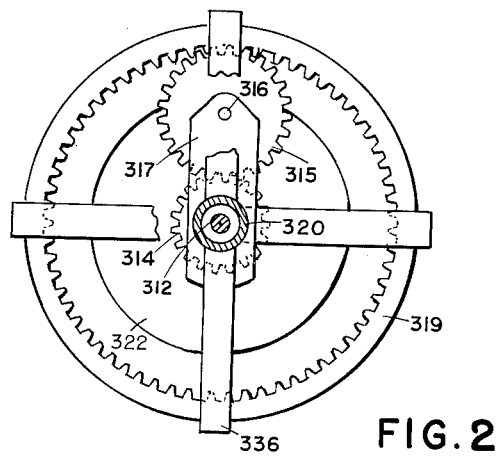

The above and other objects, features and advantages of our invention will become more readily apparent from the following description, reference being made to the accompanying drawing in which:

FIG. 1 is a top-plan view, partly in section, of a two-speed hoist drive according to the invention; and FIG. 2 is a cross-sectional view taken along line II—II of FIG. 1.

In FIG. 1 we show a two-speed drive for a hoist, exemplary of our invention, comprising two electric motors 110, 110' whose synchronized armatures are adapted to rotate a common drive shaft 312 connected therewith via respective overrunning safety clutches 311, 311'. The shaft 312 carries the primary sun gears 314, 314' of two epicyclic gear trains. Sun gear 314 meshes with a planet gear 315 whose shaft 316 is journaled in a bracket 317 rotatably carried upon shaft 312. A brake drum 322 is secured to the bracket 317 by a hollow control shaft 321 through which shaft 312 passes. An internally toothed ring gear 319, mounted in a housing 336 and serving as the secondary sun gear, meshes with the planet gear 315. The support 336 is adapted to rotate about the shaft 312 and is connected to transmit an output torque to the main pinion gear 313 via tubular output shaft 320. Pinion 313 meshes with an intermediate gear 130. The pinion 313 meshes with an intermediate gear 130 carried on a shaft 128 journaled in the walls of a transmission housing 123. Shaft 128 has rigidly affixed thereto a pair of pinion gears 129, 129' on either side of intermediate gear 130, engaging a pair of load gears 131, 131' respectively connected to cable-take-up drums 132, 132' via shafts 133, 133' journaled in the walls of the transmission housing 123 and of the hoist frame 150. These drums 132, 132', carrying cables 135, 135', are provided with conventional friction safety clutches 134, 134'. Two brake assemblies for holding and lowering the load and for shifting speeds are schematically illustrated in FIG. 1. The other epicyclic gear train comprises a planet gear 315' in mesh with the sun gear 314' and a ring gear 319'. The support 336' of the latter is connected with the pinion 313 by the output shaft 320, while the bracket 317', in which shaft 316' of gear 315' is journaled, is connected to brake drum 322' by a hollow control shaft 321'. The brake shoes 324, 324', adapted frictionally to engage brake drums 322, 322', are connected to pivoted link bars 125, 125' carrying independently operable pedals 127, 127'. Springs 140, 140', urging the shoes 124, 124' against the brake drums, are connected to the bars 125, 125' and to the hoist chassis.

In operation, with the brake 324' applied to the drum 322', the rotary motion of shaft 312 causes a rotation of the planet gear 315' in the opposite sense. Since the bracket 317' is secured against motion by the brake 324′, planet gear 315′ acts as an idler, transmitting torque to the ring gear 319′. The latter rotates with its housing 336′ and the main pinion 313 secured thereto, driving the cable drums. Concurrently, since brake 324 does not engage its brake drum 322, the rotary motion of gear 314 is transmitted to the planet gear 315 which, instead of transmitting torque to the ring gear 319, rotates with its bracket 317 about the sun gear 314. As seen in FIG. 1, the gear ratios of gear pairs 314, 315 and 314′, 315′ differ to provide two drive speeds. To shift speeds, brake 324 is engaged while brake 324′ is disengaged in the aforedescribed manner, thus transmitting torque from sun gear 314 via gears 315 and 319 to the pinion 313 while the planet gear 315′ is permitted to rotate with its bracket 317′ about the sun gear 314′. When both brakes are urged against their respective drums, as mentioned above, the pinion is locked against motion, thereby holding the load stationary, owing to the difference in gear ratio. At this time, the overrunning clutches 311, 311′ disengage the motors from drive shaft 312.

Although the embodiments of our invention particularly described and illustrated represent two-speed transmissions, it will be apparent that additional speed-change gear trains may be provided whose outputs may be linked to the load pinion, additional brakes for control purposes being then required. A single motor may also be used to drive the common input shaft 312 in place of the motor pair illustrated. These and other modifications, readily apparent to persons skilled in the art, are intended to be included within the spirit and scope of our invention, except as further limited by the appended claims.

We claim:

1. A transmission system comprising two epicyclic gear trains of different gear ratios, each of said gear trains including a sun gear provided with a first shaft, a ring gear concentrically surrounding the respective sun gear and provided with a second shaft co-axial with said first shaft, a support provided with a third shaft co-axial with said first and second shafts, and satellite-gear means journaled on said support for revolution about said shafts and rotation in mesh with said sun gear and said ring gear; a source of motive power; said first shafts being rigidly joined together as a common input shaft connected with said source; said second shafts being rigidly joined together as a common output shaft; coupling means connecting said output shaft with a load; first speed-control means engageable with the third shaft of one of said gear trains; and second speed-control means engageable with the third shaft of the other of said gear trains; said speed-control means being each adapted to immobilize the respective shaft engaged thereby so as to cause the transmission of torque from said source to said load with a speed ratio determined by the gear ratio of the gear train associated with the immobilized shaft.

2. A transmission system according to claim 1 wherein said output shaft forms a sleeve about an intermediate portion of said input shaft between said gear trains, said coupling means including a pinion carried on said sleeve.

3. A transmission system according to claim 1 wherein said first and second speed-control means are a pair of friction brakes.

References Cited in the file of this patent

UNITED STATES PATENTS

| | | |
|---|---|---|
| 763,477 | Gies | June 28, 1904 |
| 983,452 | Kirk | Feb. 7, 1911 |
| 1,372,268 | Boerner | Mar. 22, 1921 |
| 2,504,988 | Kronlund | Apr. 25, 1950 |
| 2,560,554 | Colby | July 17, 1951 |
| 2,692,514 | O'Leary | Oct. 26, 1954 |
| 2,757,513 | Banker | Aug. 7, 1956 |
| 2,796,317 | Valenti et al. | June 18, 1957 |
| 2,845,818 | Siljander | Aug. 5, 1958 |
| 3,007,352 | Biedess | Nov. 7, 1961 |
| 3,013,519 | Wiggermann | Dec. 19, 1961 |